(12) United States Patent
Dowell et al.

(10) Patent No.: US 11,370,349 B1
(45) Date of Patent: Jun. 28, 2022

(54) COIL RACK CARRIER

(71) Applicants: Patrick Dowell, Lamont, OK (US); Brad Warren Fredrick, Lamont, OK (US)

(72) Inventors: Patrick Dowell, Lamont, OK (US); Brad Warren Fredrick, Lamont, OK (US)

( * ) Notice: Subject to any disclaimer, the term of this patent is extended or adjusted under 35 U.S.C. 154(b) by 0 days.

(21) Appl. No.: 17/577,872

(22) Filed: Jan. 18, 2022

(51) Int. Cl.
*B60P 7/12* (2006.01)

(52) U.S. Cl.
CPC ..................... *B60P 7/12* (2013.01)

(58) Field of Classification Search
CPC .............. B60R 11/16; B60R 9/06; B60P 7/12
USPC ................ 211/13.1; 224/515, 514, 512, 534; 172/776; 280/769
See application file for complete search history.

(56) References Cited

U.S. PATENT DOCUMENTS

| | | | |
|---|---|---|---|
| 4,830,421 A * | 5/1989 | Hawelka | A62C 27/00 312/238 |
| 5,251,947 A * | 10/1993 | Kirila, II | B60C 27/145 410/97 |
| 5,497,927 A * | 3/1996 | Peterson | B60R 9/06 224/523 |
| 5,738,260 A | 4/1998 | Kirtland | |
| 5,941,589 A | 8/1999 | Perlman et al. | |
| 7,878,568 B2 * | 2/2011 | Wu | B62D 33/03 296/37.6 |
| 7,938,301 B2 | 5/2011 | Aurbeck | |

\* cited by examiner

*Primary Examiner* — D Glenn Dayoan
*Assistant Examiner* — Sunsurraye Westbrook
(74) *Attorney, Agent, or Firm* — Dale J. Ream

(57) ABSTRACT

A coil rack carrier for guiding and carrying a plurality of coil racks includes a pair of upstanding front guide members laterally spaced apart from one another and a pair of upstanding rear guide members laterally spaced apart from one another. Each rear guide member defines a length that is greater than a length of each front guide member. One of the pair of rear guide members is rearwardly adjacent a first one of the front guide members so as to define a first channel therebetween. Similarly, another of the pair of rear guide members is rearwardly adjacent a second one of the front guide members so as to define a second channel therebetween. For stowage the plurality of coil racks is sequentially received into the first and second channels.

18 Claims, 6 Drawing Sheets

COIL RACK CARRIER

BACKGROUND OF THE INVENTION

This invention relates generally to storage and carrying racks and, more particularly, to a coil rack carrier for carrying a plurality of coil racks beneath a semi-truck trailer deck.

Coil racks are specifically designed to keep large circular steel coils in place and off the surface of a semitruck trailer. Steel coils are one of the most dangerous cargo to store and transport as the chance of injury is increased if one doesn't take proper precautions with properly securing these coils. Coil racks are designed to ensure maximum safety for both the equipment and employees at work. Coil racks for flatbed trailers have advantages and features that are meant to combat the dangers faced by the transportation of steel coils.

Going a step further, it would be desirable to keep and inventory of coil racks in close proximity and in association with the semitruck trailer that will be hauling the coil racks, such as between a material supplier and a jobsite. More particularly, it would be desirable to store a plurality of coil racks beneath the deck of the trailer where they may be unloaded when needed atop the trailer deck for use as chocks to secure steel coils as described above. Then, it would be desirable to have a coil rack carrier with which to stow insecure the coil racks out of sight after the steel coils are offloaded, such as at a job site. In addition, it would be desirable to have a coil rack carrier that may be mounted to the main frame of the trailer and that is configured to allow the coil racks to be received quickly and efficiently two-by-two and back-to-back.

SUMMARY OF THE INVENTION

A coil rack carrier according to the present invention is useful for carrying a plurality of coil racks beneath a semi-truck trailer deck. The carrier includes a carriage including a mounting member having a first end and a second end opposite the first end, the mounting member having an elongate and linear configuration that is releasably coupled to a main frame of the semi-truck trailer. The includes a pair of support platforms extending away from the first and second ends of the mounting member, respectively. A first front guide member is coupled to and extends upwardly from a first support platform of the pair of support platforms, the first rear guide member having an elongate and linear configuration. Similarly, first rear guide member coupled to and extending upwardly from the first support platform, the first rear guide member having an elongate and linear configuration and being rearwardly displaced from the first front guide member such that the first front guide member and the first rear guide member, together, define a first channel therebetween.

A second front guide member coupled to and extending upwardly from a second support platform of the pair of support platforms, the first rear guide member having an elongate and linear configuration. A second rear guide member coupled to and extending upwardly from the second support platform, the first second guide member having an elongate and linear configuration and being rearwardly displaced from the second front guide member such that the second front guide member and the second rear guide member, together, define a second channel therebetween.

The first and second rear guide members each define a length greater than a length defined by each of the first and second front guide members, respectively, such that the first and second rear guide members act as a stop when the plurality of coil racks is sequentially received into the first and second channels for stowage atop the pair of support platforms, respectively.

Therefore, a general object of this invention is to provide a coil rack carrier for stowing and hauling a plurality of coil rack chocks beneath the deck of a semi-truck trailer.

Another object of this invention is to provide a coil rack carrier, as aforesaid, having a pair of spaced apart rear posts that are each a little taller than a pair of front posts so that the rear posts act as a stop to wheel racks being loaded onto the carrier via channels defined between front and rear posts, respectively.

Still another object of this invention is to provide a coil rack carrier, as aforesaid, having a carriage with mounting member for releasably mounting the carrier to the main frame (under the deck) of a semi-truck trailer.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 5:
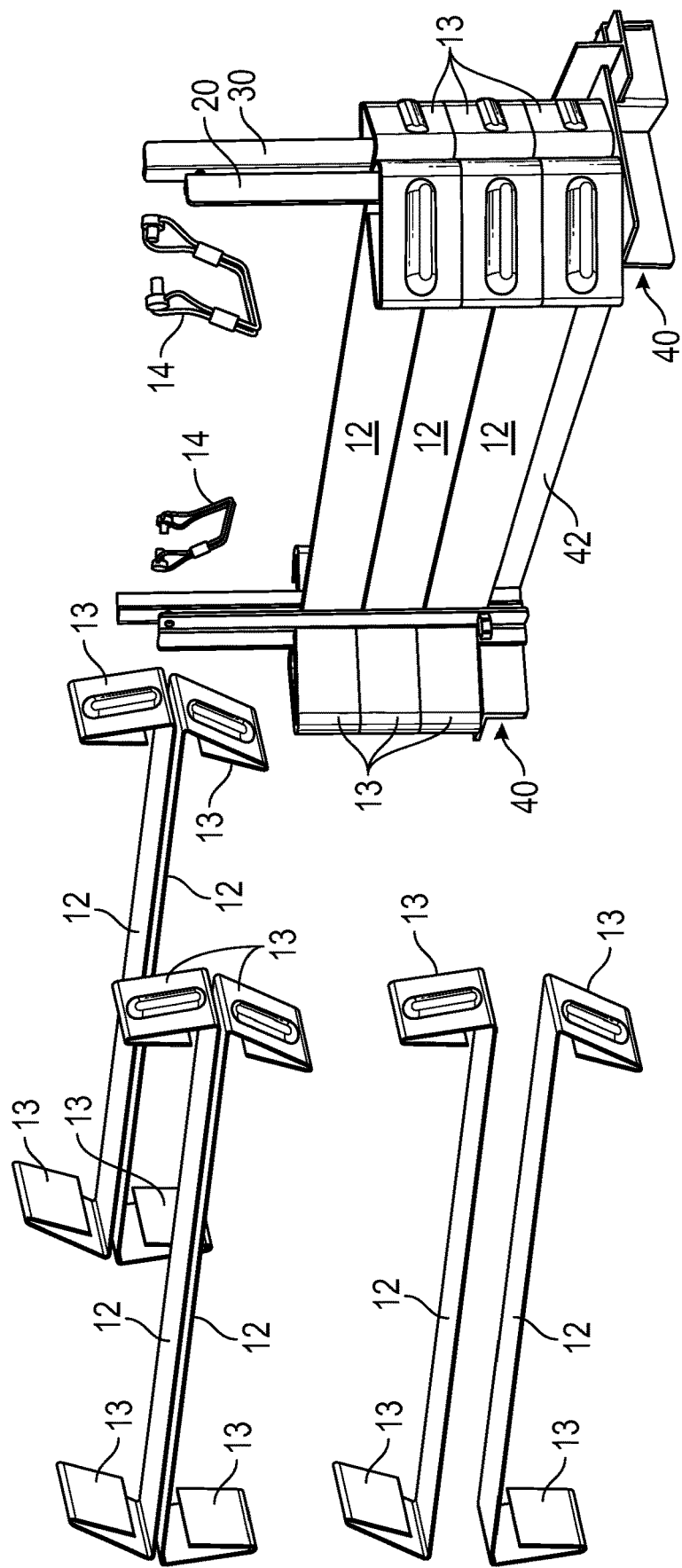
FIG. 5 is an exploded view of the coil rack as in FIG. 3, illustrating the carrier being sequentially loaded with coil racks two at a time.
Figure 6:
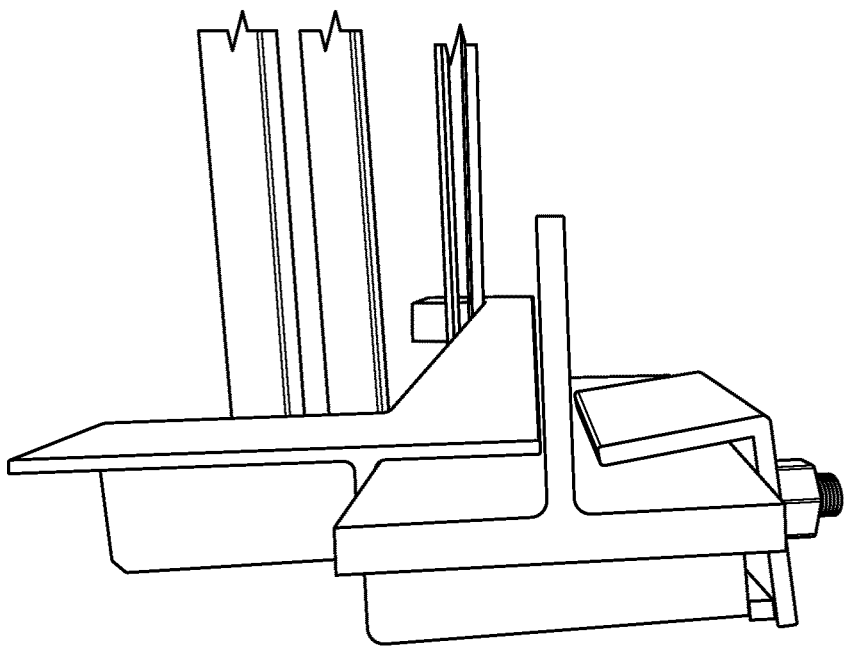
FIG. 6 is a side view of the coil rack as FIG. 4, illustrated to show mounting fasteners.
Figure 7:
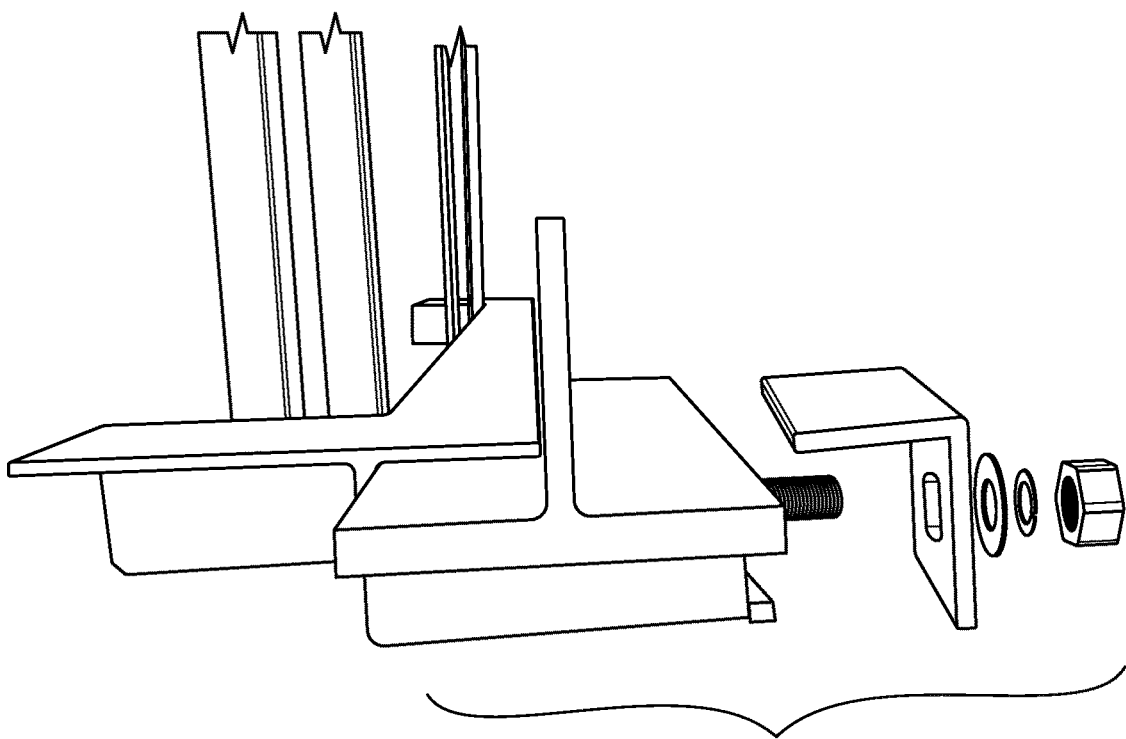
FIG. 7 is an exploded view of the coil rack mounting fasteners shown in FIG. 6.

A coil rack carrier according to a preferred embodiment of the present invention will now be described with reference to FIGS. 1 to 7 of the accompanying drawings. The coil rack carrier 10 includes a pair of front guide members 20, a pair of rear guide members 30, a carriage 40 having a mounting member 42, and a pair of support platforms 44 each configured for supporting a plurality of coil racks 12. As illustrated, each coil rack 12 may include a pair of longitudinally spaced apart (i.e., opposed) chocks 13 (FIG. 5).

The coil rack carrier 10, according to the preferred embodiment of the present invention, is configured to receive five rows of coil racks, each row being two deep. In other words, a coil rack carrier 10 is preferably designed to receive and secure a total of 10 coil racks 12 received in groups of two coil racks 12 in a back-to-back orientation (FIG. 5).

Described in more detail, the coil rack carrier 10 may include a pair of front guide members 20 each having an elongate, upstanding, and linear configuration. Preferably, the pair of front guide members 20 are laterally spaced apart and, together, define an imaginary longitudinal axis therebetween. In fact, the coil rack carrier 10 may include a carriage 40 having a mounting member 42 operatively coupled to and extending between the pair of front guide members 20 as will be described further later. Similarly, the coil rack carrier 10 may include a pair of rear guide members 30 each having an elongate, upstanding, and linear configuration. Preferably, the pair of rear guide members 20 are laterally spaced apart and, together, define an imaginary longitudinal axis therebetween. Again, the mounting member 42 may be operatively coupled to and extend between the pair of rear guide members 20. As shown, each one of the pair of front guide members 20 and each one of the pair of rear guide verse 30 have a linear and upstanding configuration and are, therefore, parallel to one another. Preferably, each front guide member and each rear guide member may be one of a rod, a post, a strut, a plank, or the like.

Figure 1:
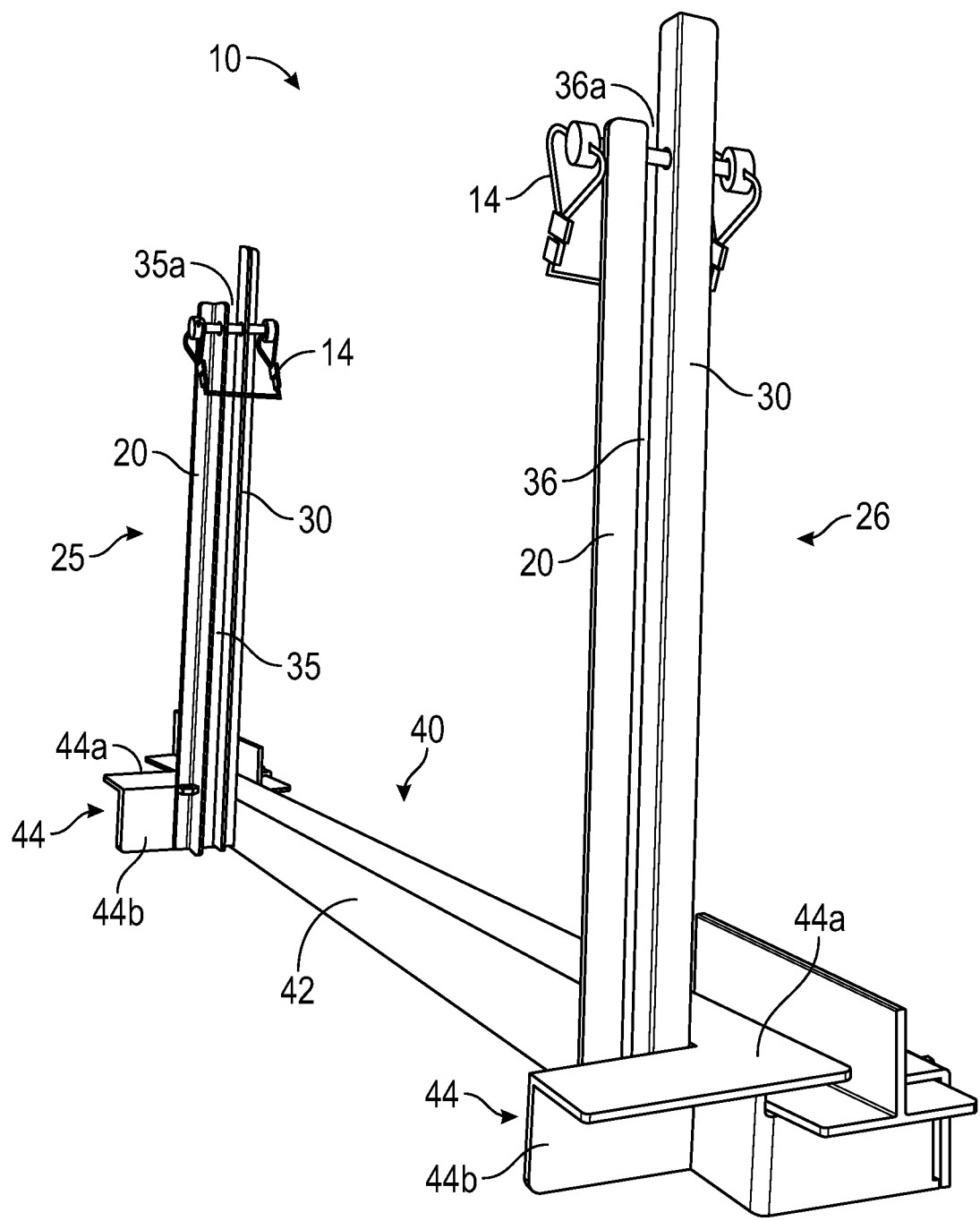
FIG. 1 is a front perspective view of a coil rack according to a preferred embodiment of the present invention, illustrated in an unloaded configuration.
Figure 2:
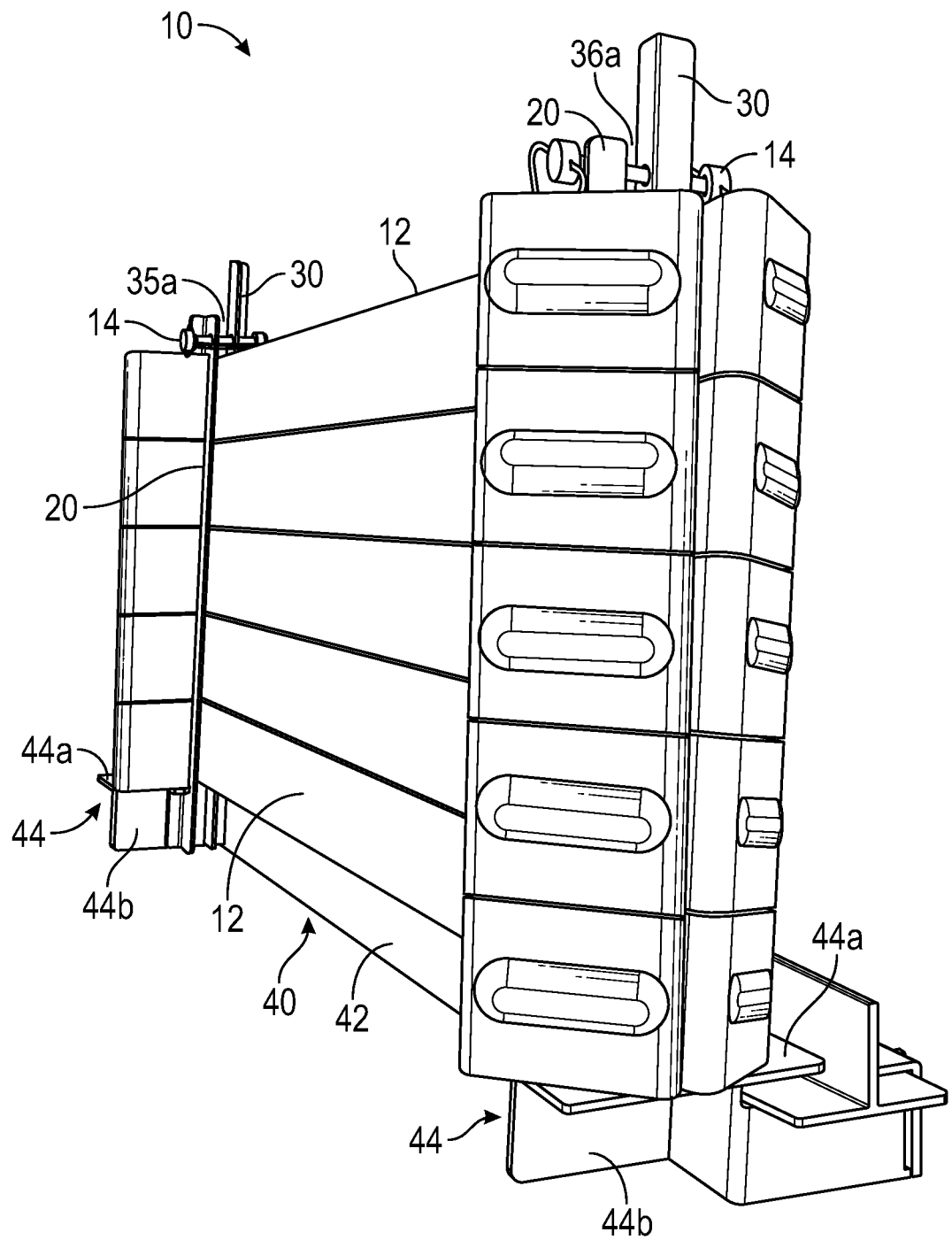
FIG. 2 is another front perspective view of the coil rack as in FIG. 1, illustrated in a loaded configuration.

In a critical aspect, a first one of said pair of rear guide members is rearwardly adjacent a first one of said front guide members so as to define a first channel 35 therebetween. Stated another way, the coil rack carrier 10 may include a left portion 25 having a left front guide member and a left rear guide member that are associated with and adjacent one another. More particularly, the left rear guide member is positioned slightly behind or rearwardly spaced from the associated left front guide member. Together, the associated left front and rear guide members defined a first channel 35 therebetween that has a vertical orientation consistent with the upstanding orientation of the guide members themselves, respectively. Likewise, a second one of said pair of rear guide members is rearwardly adjacent a second one of said front guide members so as to define a second channel therebetween. Stated another way the coil rack carrier 10 may include a right portion 26 having a right front guide member and a right rear guide member that are associated with and adjacent one another. More particularly, the right rear guide member is positioned slightly behind or rearwardly spaced from the associated right front guide member. Together, the associated right front and rear guide members defined a second channel 36 therebetween that has a vertical orientation consistent with the upstanding orientation of the guide members themselves, respectively. As best shown in FIG. 1, the upper ends of the first and second channels 35, 36 includes an open configuration for receiving respective ends of respective coil racks 12. The coil racks carrier 10 includes a pair of rack fasteners 14 that may be inserted through upper ends of associated front and rear guide members, so as to prevent further coil racks from being inserted into or removed from respective channels 35, 36. Specifically, the plurality of coil racks 12 each include an elongate linear configuration and, when the rack fasteners 14 are removed, may be selectively received into the first and second channels 35, 36, respectively, where they slide downwardly by the force of gravity and are stowed as will be described in further detail later.

In another critical aspect, the pair of rear guide members 30 each define a length that is greater than a length defined by each of the front guide members 20. In other words, each of the rear guide members 30 is taller than each of the front guide members 20. In an embodiment, each rear guide member 30 is at least 15% longer/taller than its associated front guide member 20. In some embodiments, each rear guide member 30 may be even a greater amount taller. In any case, it will be understood that the rear guide members 30 are taller so as to be a stop or barrier to a respective coil rack 12 being inserted horizontally into respective channels 35, 36 of the coil rack carrier 10. Stated another way, and coil rack 12 inserted horizontally will clear respective front guide members 20 but be stopped by associated rear guide members 30 and will then naturally and by gravity fall into appropriate channels 35, 36.

In another aspect, the coil rack carrier 10 may include a carriage 40 extending around between the left and right portions 25, 26 of the guide members. More particularly, the carriage 40 may include a mounting member 42, also having a linear and elongate configuration, operatively coupled to and extending between the left and right portions of front and rear guide members as described above. It is understood that a pair of support platforms 44 may be releasably coupled to a trailer of a semi-truck. More particularly, the carriage 40 may include a pair of support platforms 44 connected to lower ends of the first and second front and rear guide members, respectively, the pair of support platforms being configured to support opposed ends of the plurality of coil racks when received by said first and second channels, respectively. To do so, each support platform 44 includes a horizontal portion 44a parallel to a ground surface (i.e., a flat surface) and a vertical portion 44b extending downwardly perpendicular to said horizontal portion 44b. It is understood that the shape configuration of the carriage 40, including the portions of the support platforms 44 and including the mounting member 42 enable the coil rack carrier 10 to stand upright upon a ground surface, such as prior to being mounted to a main frame of a semitruck trailer.

Figure 3:
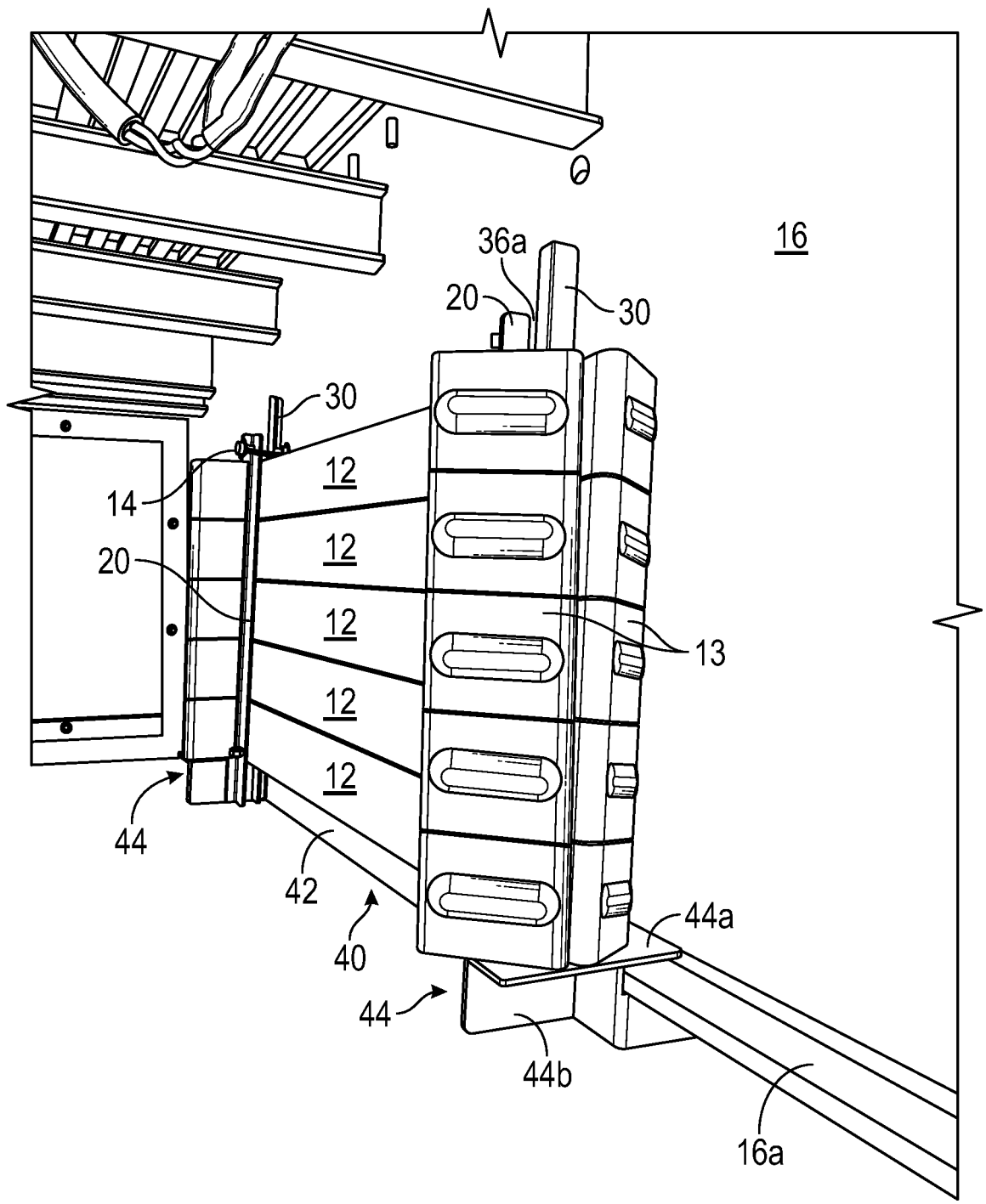
FIG. 3, is a front perspective view of the coil rack as an FIG. 2, illustrated coupled to a mainframe of a semitruck trailer.
Figure 4:
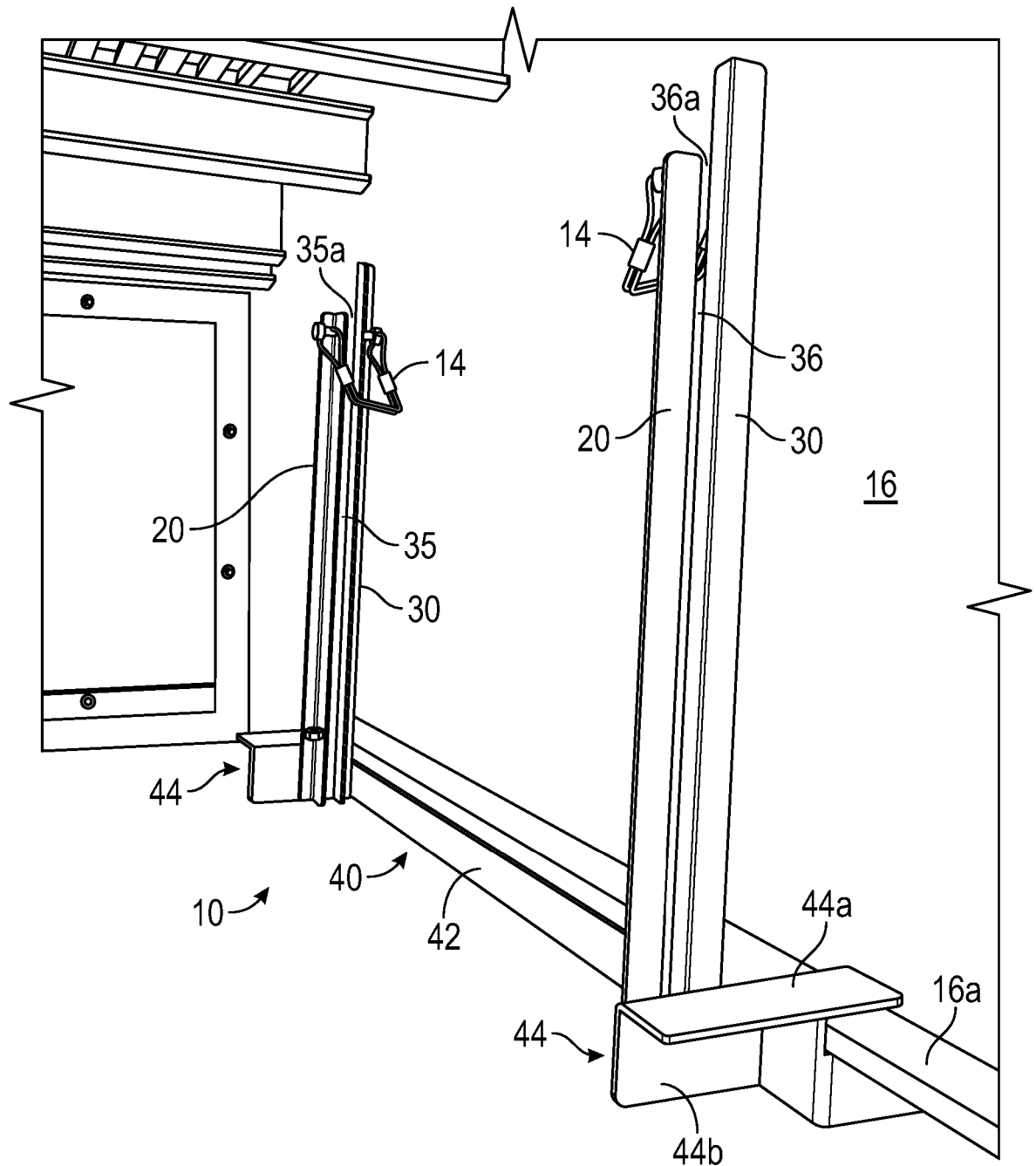
FIG. 4 is a front perspective view of the coil rack as in FIG. 1, illustrated coupled to a mainframe of a semitruck trailer.

In use, the mounting member 42 of the carriage 40 may be mounted, such as with bolts or the like, to a frame member 16a of a semitruck trailer 16 as shown in FIG. 3. Then, when the plurality of coil racks 12 are no longer needed on the deck surface of the trailer, such as when the steel coils which were secured thereby are offloaded, the coil racks 12 may be inserted horizontally and back-to-back that first clears an upper end of the pair of front guide members 20, is stopped by the pair of rear guide members 30 and falls via the force of gravity into respective first and second channels 35, 36 and is stowed atop respective support platforms 44 as described above.

It is understood that while certain forms of this invention have been illustrated and described, it is not limited thereto except insofar as such limitations are included in the following claims and allowable functional equivalents thereof

The invention claimed is:
1. A coil rack carrier for guiding, supporting, and carrying a plurality of coil racks, said coil rack carrier, comprising:
   a pair of front guide members laterally spaced apart from one another and each having an elongate, upstanding, and linear configuration;
   a pair of rear guide members laterally spaced apart from one another and each having an elongate, upstanding, and linear configuration, each rear guide member defining a length that is greater than a length of each front guide member;
   wherein a first one of said pair of rear guide members is rearwardly adjacent a first one of said front guide members so as to define a first channel therebetween;
   wherein a second one of said pair of rear guide members is rearwardly adjacent a second one of said front guide members so as to define a second channel therebetween;
   whereby the plurality of coil racks is sequentially received into said first and second channels.
2. The coil rack carrier as in claim 1, wherein said first channel has an upper end that is open and said second channel has an upper end that is open such that the plurality of coil racks is sequentially received into said first and second channels through said upper ends, respectively.

3. The coil rack carrier as in claim 1, further comprising a pair of support platforms connected to lower ends of said first and second front and rear guide members, respectively, said pair of support platforms being configured to support opposed ends of the plurality of coil racks when received by said first and second channels, respectively.

4. The coil rack carrier as in claim 3, wherein said pair of support platforms each is perpendicular to said pair of front and rear guide members, respectively.

5. The coil rack carrier as in claim 4, wherein said pair of support platforms each includes a horizontal portion parallel to a ground surface and a vertical portion extending downwardly perpendicular to said horizontal portion.

6. The coil rack carrier as in claim 3, further comprising a mounting member extending between said pair of support platforms and operatively coupled to a trailer of a semi-truck.

7. The coil rack carrier as in claim 1, wherein said pair of front guide members and said pair of rear guide members is taken from a group consisting of a rod, post, strut, or plank.

8. The coil rack carrier as in claim 1, wherein said pair of rear guide members each define a length greater than a length defined by each of said front guide members, respectively.

9. A coil rack carrier for carrying a plurality of coil racks beneath a semi-truck trailer deck, comprising:
a carriage having a first end and a second end opposite the first end, said carriage having an elongate and linear configuration releasably coupled to a main frame of the semi-truck trailer;
a left portion having a first front guide member coupled to and extending upwardly from said first end of said carriage, said first front guide member having an elongate and linear configuration,
said left portion having a first rear guide member coupled to and extending upwardly from said first end of said carriage, said first rear guide member having an elongate and linear configuration and being rearwardly displaced from said first front guide member such that said first front guide member and said first rear guide member, together, define a first channel therebetween;
wherein said first front guide member and said first rear guide member are closely adjacent one another and, together, define a first channel therebetween;
a right portion having a second front guide member coupled to and extending upwardly from said second end of said carriage, said second front guide member having an elongate and linear configuration,
said right portion having a second rear guide member coupled to and extending upwardly from said second end of said carriage, said second rear guide member having an elongate and linear configuration and being rearwardly displaced from said second front guide member such that said second front guide member and said second rear guide member, together, define a second channel therebetween;
wherein said first and second rear guide members each define a length greater than a length defined by each of said first and second front guide members, respectively;
wherein the plurality of coil racks is sequentially received into said first and second channels.

10. The coil rack carrier as in claim 9, wherein said first front guide member is parallel to said first rear guide member and are adjacent one another except being separated by said first channel.

11. The coil rack carrier as in claim 9, wherein said carriage includes a pair of support platforms coupled to said left and right portions, respectively, said pair of support platforms being configured to support opposed ends of the plurality of coil racks when received into said first and second channels, respectively.

12. The coil rack carrier as in claim 11, wherein said pair of support platforms each includes a horizontal portion parallel to a ground surface and a vertical portion extending downwardly perpendicular to said horizontal portion.

13. The coil rack carrier as in claim 11, wherein said carriage includes a mounting member coupled to and extending between said pair of support platforms that is operatively coupled to a trailer of a semi-truck.

14. The coil rack carrier as in claim 9, wherein said pair of front guide members and said pair of rear guide members are taken from a group consisting of a rod, post, strut, or plank.

15. A coil rack carrier for carrying a plurality of coil racks beneath a semitruck trailer deck, comprising:
a carriage including a mounting member having a first end and a second end opposite the first end, the mounting member having an elongate and linear configuration that is releasably coupled to a main frame of the semitruck trailer;
wherein said carriage includes a pair of support platforms extending away from said first and second ends of said mounting member, respectively, said pair of support platform each having a horizontal portion;
a first front guide member coupled to and extending upwardly from a first support platform of said pair of support platforms, said first rear guide member having an elongate and linear configuration;
a first rear guide member coupled to and extending upwardly from said first support platform, said first rear guide member having an elongate and linear configuration and being rearwardly displaced from said first front guide member such that said first front guide member and said first rear guide member, together, define a first channel therebetween;
a second front guide member coupled to and extending upwardly from a second support platform of said pair of support platforms, said first rear guide member having an elongate and linear configuration;
a second rear guide member coupled to and extending upwardly from said second support platform, said first second guide member having an elongate and linear configuration and being rearwardly displaced from said second front guide member such that said second front guide member and said second rear guide member, together, define a second channel therebetween;
wherein said first and second rear guide members each define a length greater than a length defined by each of said first and second front guide members, respectively; and
wherein said first and second rear guide members act as a stop when the plurality of coil racks is sequentially received into said first and second channels for stowage atop said pair of support platforms, respectively.

16. The coil rack carrier as in claim 15, wherein said first and second rear guide members each define a length at least 10% longer than a length defined by each of said first and second front guide members, respectively.

17. The coil rack carrier as in claim 15, wherein said first and second channels each include an upper end that is open for receiving said plurality of coil racks, respectively.

18. The coil rack carrier as in claim 15, wherein said pair of support platforms are configured to support opposed ends of the plurality of coil racks when received into said first and second channels, respectively.

\* \* \* \* \*